US009012853B2

(12) United States Patent
Gueorguiev et al.

(10) Patent No.: US 9,012,853 B2
(45) Date of Patent: Apr. 21, 2015

(54) RADIATION MEASUREMENT USING TIMING-OVER-ETHERNET PROTOCOL

(75) Inventors: Andrey K. Gueorguiev, Oak Ridge, TN (US); Martin F. Ohmes, Knoxville, TN (US); Jeffrey R. Preston, Knoxville, TN (US); Leslie D. Hoy, Knoxville, TN (US); Hartmut Brands, Oak Ridge, TN (US)

(73) Assignee: FLIR Detection, Inc., Stillwater, OK (US)

( * ) Notice: Subject to any disclaimer, the term of this patent is extended or adjusted under 35 U.S.C. 154(b) by 407 days.

(21) Appl. No.: 13/068,208

(22) Filed: May 5, 2011

(65) Prior Publication Data

US 2012/0153166 A1 Jun. 21, 2012

Related U.S. Application Data

(60) Provisional application No. 61/395,424, filed on May 13, 2010.

(51) Int. Cl.
| | | |
|---|---|---|
| *G01J 1/42* | (2006.01) | |
| *G01T 1/20* | (2006.01) | |
| *G01T 7/00* | (2006.01) | |
| *G01T 1/172* | (2006.01) | |

(52) U.S. Cl.
CPC .. *G01T 7/00* (2013.01); *G01T 1/172* (2013.01)

(58) Field of Classification Search
USPC .......................................... 250/362, 394, 366
See application file for complete search history.

(56) References Cited

U.S. PATENT DOCUMENTS

| | | |
|---|---|---|
| 6,804,580 B1 | 10/2004 | Stoddard et al. |
| 7,411,937 B2 | 8/2008 | Guilford |
| 7,486,681 B2 | 2/2009 | Weber |
| 7,561,598 B2 | 7/2009 | Stratton et al. |

(Continued)

FOREIGN PATENT DOCUMENTS

WO  WO 2007/015198  *  2/2007  ................ G01T 1/29

OTHER PUBLICATIONS

IEEE 1588 Standard for a Precision Clock Synchronization Protocol for Networked Measurement and Control Systems, published Aug. 13, 2009, available at http://www.nist.gov/el/isd/ieee/ieee1588.cfm.*

(Continued)

*Primary Examiner* — David J Makiya
*Assistant Examiner* — Kenneth J Malkowski
(74) *Attorney, Agent, or Firm* — Haynes and Boone, LLP (57) ABSTRACT

A highly scalable platform for radiation measurement data collection with high precision time stamping and time measurements between the elements in the detection array uses IEEE 1588 with or without Synchronous Ethernet (timing over Ethernet) to synchronize the measurements. At a minimum, the system includes at least two radiation detector units, an IEEE 1588 and SyncE enabled Ethernet switch, and a computer for processing. The addition of timing over Ethernet and power over Ethernet (PoE) allows a radiation measurement system to operate with a single Ethernet cable, simplifying deployment of detectors using standardized technology with a multitude of configuration possibilities. This eliminates the need for an additional hardware for the timing measurements which simplifies the detection system, reduces the cost of the deployment, reduces the power consumption of the detection system and reduces the overall size of the system.

21 Claims, 7 Drawing Sheets

(56) References Cited

U.S. PATENT DOCUMENTS

| | | | |
|---|---|---|---|
| 7,607,166 | B2 | 10/2009 | Coley et al. |
| 7,630,728 | B2 | 12/2009 | Cutler |
| 7,630,736 | B2 | 12/2009 | Wang |
| 7,656,751 | B2 | 2/2010 | Rischar et al. |
| 7,680,154 | B2 | 3/2010 | Stanton et al. |
| 7,689,854 | B2 | 3/2010 | Ilnicki et al. |
| 7,707,000 | B2 | 4/2010 | Baney et al. |
| 2010/0187424 | A1* | 7/2010 | Majewski et al. .......... 250/363.05 |

OTHER PUBLICATIONS

IEEE-1588 and Synchronous Ethernet in Telecom, 2007 International IEEE Symposium on Precision Clock Synchronization (ISPCS) for Measurement, Control and Communication Vienna, Austria, Oct. 1-3, 2007, pp. 138-141 to Rodrigues.*

"Parallel Data Acquisition Systems for a Compton Camera", Presentation at "Compton Camera Applications to Medical Imaging" Sep. 5-7, 2002, available at http://www.iss.infn.it/congresso/ccworkshop/presentations.htm, to Nurdan et al.*

Eidson, J. C. "Network Time Synchronization with IEEE 1588 (Time distribution in Embedded Systems)." (2009) EECS-149. University of California Berkeley, Berkeley.

Fontaine et al. "A Data Acquisition Sub-System for Dist'd, Digital, Comp., APD-Based, Bimodal PET/CT Architecture for Small Animal Imaging" (2004) IEEE doc No. 0-7803-8257-9/0.

Paulus, T. J. "Timing electronics and fast timing methods with scintillation detectors," (1985) IEEE Trans. on Nucl. Sci. NS-32: 1242-49.

Lindenstruth, V. et al. "Trigger/clock distribution tree requirement document" (1996).

Moreira et al. "White Rabbit: Sub-Nanosecond Timing Distribution over Ethernet," (2009), IEEE Symp. Prec. Clock Synchro., Brescia, Italy.

Przhybylski, G.T. "Clock Distribution and Synchronizing to UT" (2001) Lawrence Berkeley Laboratory, http://glacier.lbl.gov/gtp/AMANDA19/ClkDistributionSystem.html.

Miller, D. "DP83640 Synchronous Ethernet Mode: Achieving Sub-nanosecond Accuracy in PTP Applications," (2007) National Semiconductor Application Note 1730.

* cited by examiner

RADIATION MEASUREMENT USING TIMING-OVER-ETHERNET PROTOCOL

CROSS-REFERENCE TO RELATED APPLICATIONS

This application claims the benefit of U.S. Provisional Application Ser. No. 61/395,424 entitled Radiation Measurement Using Timing-Over-Ethernet Protocol, filed by the present inventors on May 13, 2010, the entire disclosure of which is incorporated herein by reference.

STATEMENT REGARDING FEDERALLY SPONSORED RESEARCH

This invention was made with Government support under Contract No. HDTRA1-09-C-0012 awarded by the U.S. Defense Threat Reduction Agency to ICx Radiation, Inc., and the Government has certain rights in this invention.

BACKGROUND OF THE INVENTION

1. Field of the Invention

The invention pertains to apparatus and methods for detecting radiation, and more particularly to radiation detectors that rely on measuring the time between detection events to obtain useful information.

2. Description of Related Art

Radiation is typically measured by detecting an electrical pulse that is generated through an interaction or set of interactions, and is proportional to the energy deposited in the detector by the radiation. The time between individual events gives an indication of the size or strength of the radiation source. In addition, if the time between sequential events from multiple detectors is short enough, the geometry of the detectors and the energy deposited in each detector may be used to identify the approximate origin of the radiation source through a method known as Compton scattering; the device is commonly referred to as a Compton camera. Fundamental to performing this measurement, one must know the exact time between measurements in order to determine if the individual events are from a true Compton scattering interaction.

The measurement of this time difference can be performed in two different ways. The first method is to use one of the detectors to generate a start signal and the second detector to generate a stop signal. These signals trigger a stop watch function, which generates an analog signal that is proportional to the time between the signals. If the time is below a specified threshold, then the events are recorded as being coincident, or are indicated as being a Compton scattered event. This method is only practical for a small number of detectors, usually limited to only two, and does not scale well to larger systems. (The general approach is described by T. J. Paulus in "Timing electronics and fast timing methods with scintillation detectors," IEEE Trans. on Nucl. Sci. NS-32: 1242-49 (1985). See FIGS. 12 and 13 therein for examples of system implementations. Some commercial systems and methods are described in an application note from Canberra Industries, "Timing and Coincidence Counting Systems." In the systems taught therein, each separate box shown on the diagram is a separate instrument.)

The second method of measuring the time difference is by generating a time stamp for each event. These time stamps can then be compared to find coincident events. However, this system is limited by the accuracy and precision of the time synchronization of the individual detector electronics that generate the time stamps. While this method is adaptable for large systems, it must be designed for the specific system and is not easily scalable. Designers of several large physics experiments have independently developed methods of generating the timestamps and for distributing the clock signals in order to synchronize the units, showing that the technology is not scalable or portable. An example system includes the IceCube project based on the AMANDA clocking system, which synchronizes nodes through the distribution of a GPS time signal. For this to work each cable must be exactly the same length with a balanced tree configuration to maintain signal propagation time delays between the clock source and every node, as described in "Clock Distribution and Synchronizing to UT" by G. T. Przhybykski, Lawrence Berkeley Laboratory (2001). The STAR trigger system uses proprietary electronics to distribute the clock to each readout card located at each node of the system ["Trigger/clock distribution tree requirement document" by V. Lindenstruth et al. (1996)]. An example PET/CT system requires a time resolution of 5-4 ns and utilizes a design that propagates a low frequency clock signal between individual boards that is converted to a high speed clock using an LVPECL and propagated to the ADC and FPGA for each detector, as described in "A Data Acquisition Sub-System for Distributed, Digital, Computational, APD-Based, Bimodal PET/CT Architecture for Small Animal Imaging" by R. Fontaine et al. document No. 0-7803-8257-9/04/IEEE (2004). Standardized solutions are available from manufacturers such as the CAEN Waveform Digitizers for high density digitization and synchronization of up to 64 channels. High accuracy clock synchronization is possible in this system since all of the digitization and processing is done on the same card or circuit board for all of the channels, thus requiring all of the detectors to be located in close proximity to the digitizer. This can be problematic as most radiation induced events have low signal levels which can be easily dominated by noise.

The IEEE 1588 standard refers to a communication protocol originally developed to allow factory automation tools to communicate with one another. Some applications of IEEE 1588 protocols to factory automation are disclosed in U.S. Pat. No. 6,804,580 by Stoddard et al.; U.S. Pat. No. 7,656,751 by Rischar et al.; and U.S. Pat. No. 7,607,166 by Coley et al. It has also been applied to automated test systems, as taught for example in U.S. Pat. No. 7,707,000 by Baney et al.; and U.S. Pat. No. 7,561,598 by Stratton et al. Use in synchronizing audio devices is disclosed in U.S. Pat. No. 7,680,154 by Stanton et al. A number of patents have been issued for applications involving time synchronization in various communication networks, of which the following are typical: U.S. Pat. No. 7,689,854 to Ilnicki et al.; U.S. Pat. No. 7,630,736 to Wang; U.S. Pat. No. 7,630,728 to Cutler et al.; U.S. Pat. No. 7,486,681 to Weber; and U.S. Pat. No. 7,411,937 to Guilford.

For background purposes, the following industry standards are incorporated herein by reference in their entirety:
1. IEEE 1588-2002—original standard also known as version 1, IEEE 1588v1, or PTPv1
2. IEEE 1588-2008—revised standard also known as version 2, IEEE 1588v2, or PTPv2
3. Synchronous Ethernet (SyncE) Specification—ITU-T Rec. G.8261 (http://www.itu.int/rec/T-REC-G.8261-200804-I/en)
4. SyncE Slave Clock Specification—ITU-T Rec. G.8262 (http://www.itu.int/rec/T-REC-G.8262/en)
5. SyncE Related Specification—ITU-T Rec. G.8264 (http://www.itu.int/rec/T-REC-G.8264-200810-I/en)

OBJECTS AND ADVANTAGES

Objects of the present invention include the following: providing a large-scale radiation measurement system having reduced complexity; providing a large-scale radiation measurement system having relatively low cost; providing a large-scale radiation measurement system that provides accurate time information for each event and each system element; providing a large-scale radiation measurement system that requires low power; providing a large-scale radiation measurement system in which synchronization and time measurement is provided by a network protocol and not by hardware; providing a large-scale radiation measurement system requiring only one cable to be connected through a switch to the server; and, providing a highly scalable radiation measurement system in which the number of detection elements can be expanded or contracted without adding any additional complexity of the system.

These and other objects and advantages of the invention will become apparent from consideration of the following specification, read in conjunction with the drawings.

SUMMARY OF THE INVENTION

According to one aspect of the invention, a radiation detector comprises:
at least two radiation detecting nodes;
a CPU in communication with the nodes to detect signals associated with radiation detection events; and,
a clock system synchronizing the radiation detection nodes according to IEEE 1588 protocol.

According to another aspect of the invention, a method for detecting radiation comprises the following steps:
a) providing a plurality of radiation detecting nodes, each of which converts a radiation capture event into an electrical signal;
b) providing a CPU in communication with each of the radiation detecting nodes, to analyze the electrical signals and obtain information indicating a selected characteristic of the radiation captured; and,
c) providing a clock system to synchronize each of the plurality of radiation detecting nodes, the clock system operating according to IEEE 1588 protocol.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore non-limiting embodiments illustrated in the drawing figures, wherein like numerals (if they occur in more than one view) designate the same elements. The features in the drawings are not necessarily drawn to scale.

DETAILED DESCRIPTION OF THE INVENTION

One aspect of the invention is the utilization of IEEE 1588 with or without Synchronous Ethernet (timing over Ethernet) to form a highly scalable platform for radiation measurement data collection with high precision time stamping and time measurements between the elements in the detection array. The addition of timing over Ethernet and power over Ethernet (PoE) allows a radiation measurement system to operate with a single Ethernet cable, greatly simplifying deployment of detectors using standardized technology with a multitude of configuration possibilities. This eliminates the need for an additional hardware for the timing measurements which simplifies the detection system, reduces the cost of the deployment, reduces the power consumption of the detection system and insures a compact implementation.

As will be described in greater detail in the following examples, the invention provides a multi-detector system having sub-nanosecond synchronization between the system elements; the inventive system is distinguished from conventional approaches by its reduced complexity, reduced costs and increased scalability. The minimum configuration consists of two detection elements connected via an Ethernet cable through an Ethernet switch to an event builder. The detection elements operate as spectrometers collecting energy and time of each event (typically gamma radiation detections). The system can be expanded by simply adding additional detection elements and connecting them with respective Ethernet cables to the server/event builder through a switch. This simplicity is a key advantage of the invention compared to other timing methods in radiation measurement applications.

In one example, the invention consists of at least two detection elements which may be connected through a switch to an event builder. The detection elements are synchronized through the use of IEEE 1588 with or without the addition of synchronous Ethernet (SyncE) feature. The detection elements may also be powered over the Ethernet connection through the use of Power over Ethernet (PoE). Each detection element consists of a sensor section, a processing section, and a communications section. The sensor section is a radiation detector, examples of which are scintillators such as NaI(Tl), BSO, LSO, CsI, LaBr$_3$, CaF$_2$, BaF$_2$, CdWO$_4$, plastics, and organic liquid detectors, or semiconductors such as CdTe, CdZnTe, HPGe, HgI$_2$, Si, and TlBr. The processing section analyzes the signals generated by the sensor section and applies an absolute timestamp to the events of interest. The timestamp is synchronized to other detection elements through the communication section which works with the processing section to form the timestamp. The time measurement between any two or more elements in the system is performed by calculating the difference between the time stamps. In this way a complex time measurement system is reduce to a simple algorithm performed in the event builder. This configuration allows for a wide range of detectors (sensor section) to be coupled as detection elements which produce highly synchronized timestamps with tens of nanosecond to sub nanosecond accuracy. The detection elements may also be configured in any geometry with varying numbers of elements making the invention highly scalable, which has been the limitation of prior art.

Example

Figure 1:
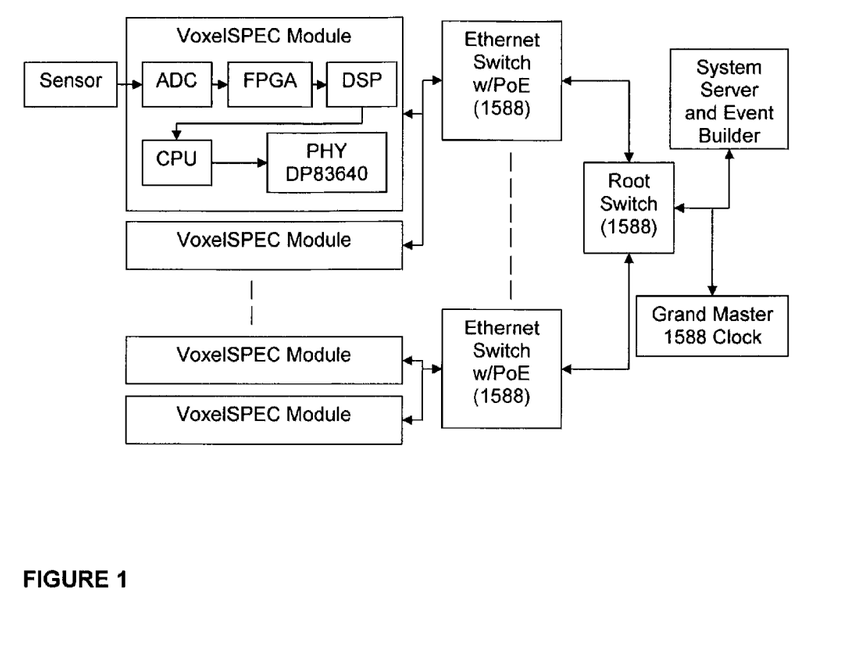
FIG. 1 is a schematic diagram of one example of the present invention.

An example of the invention is shown schematically in FIG. 1. Detection elements (voxeISPEC Modules) each consist of a sensor section, a signal processing section that includes ADC, FPGA, and DSP components as are familiar in the art, a CPU, and a communications section. The network architecture includes a system server and event builder, a grand master 1588 clock, and one or more 1588-compliant switches.

Those skilled in the art of radiation detection will appreciate that the detection unit can incorporate a scintillator/photomultiplier (PMT), a direct readout of any semiconductor radiation detector through a preamplifier, or any other suitable radiation detector, including, but not limited to, proportional counters, ionization chambers, and Geiger-Mueller counters. The unit typically incorporates a high voltage supply for the PMT or to bias the semiconductor detector, preamplifier and amplifier electronics for initial signal conditioning, followed by an analog to digital converter (ADC) to transfer the analog signals to a digital domain which is connected to a field-programmable gate array (FPGA).

The FPGA is used to find the trigger of a radiation event by generating the timestamp, which is synchronized via the IEEE 1588 Transceiver or PHY. The timestamp and the ADC data stream are forwarded to a digital signal processor (DSP) where the DSP determines the energy of the radiation event and combines the energy and timestamp information into an event package. The event package can contain additional event related information, such as pulse shape or time distance to the previous event. The event package is then forwarded by the DSP to a CPU for further packaging of the data into an UDP/IP frame and sent out over Ethernet to a main server/event builder. The CPU is also responsible for closing the servo loop of the 1588 Transceiver/PHY which enables the IEEE 1588 protocol to lock the phase of the clock or timestamp.

The use of IEEE 1588 allows the synchronization of both phase and frequency of clocks over Ethernet. This protocol can be used in conjunction with Synchronous Ethernet or SyncE (ITU-T Rec. G.8261, ITU-T Rec. G.8262, ITU-T Rec. G.8264) whereby IEEE 1588 only synchronizes the clock phase (i.e., time of day) and SyncE is used to synchronize the clock frequency (ticks per second). Additionally, Power over Ethernet (PoE) can be provided over the Ethernet cable though a PoE injector or PoE enabled switch, as are well known in the art. In this way the entire detection unit can be operated through a single Ethernet cable which provides a medium for data transfer, timing synchronization and power. If any of these components are missing from the Ethernet connection, they may be added through the use of additional connections, such as USB.

Example

Figure 2:
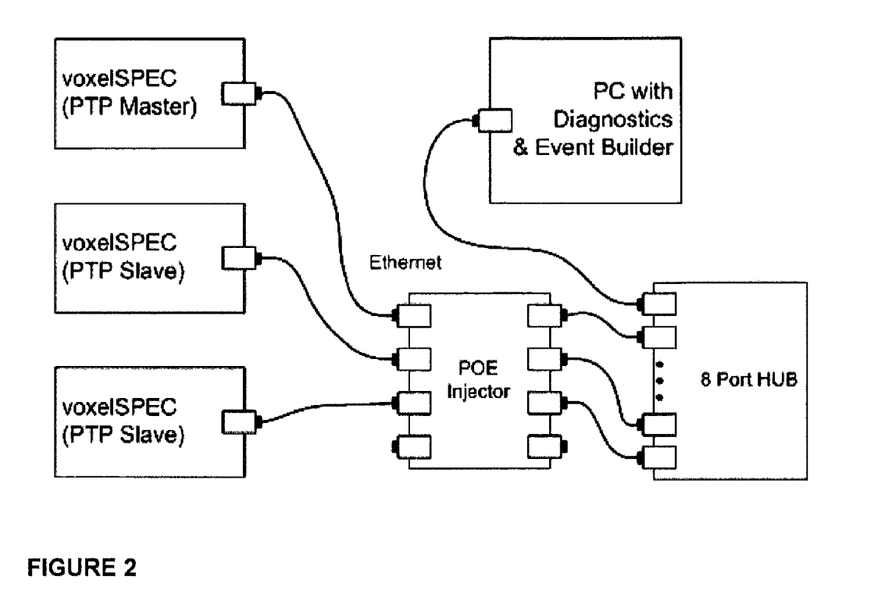
FIG. 2 is a schematic diagram of another example of the invention, illustrating operation of the internal clock mode.
Figure 3:
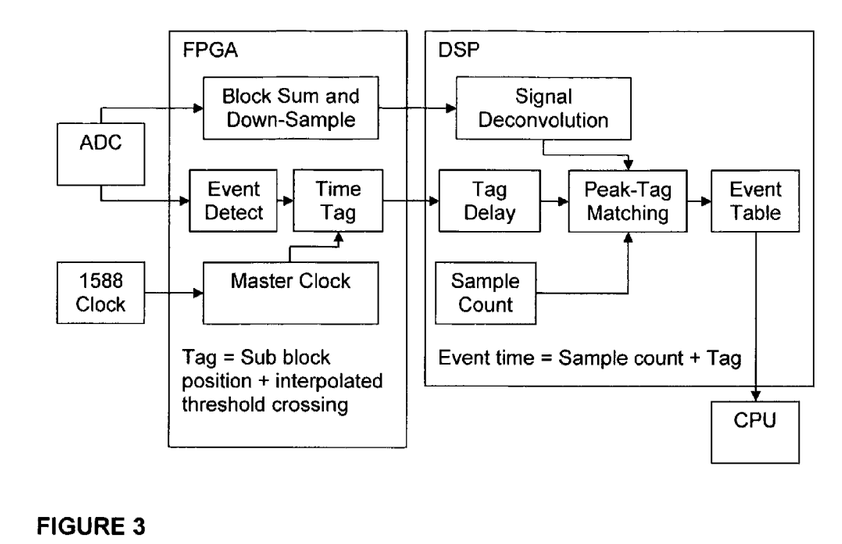
FIG. 3 is a schematic diagram of another example of the present invention, illustrating the general approach to time and energy measurements.

The voxeISPEC module, shown in FIG. 2, is visually similar to a common photomultiplier tube base; however, it contains all the signal processing circuitry necessary to determine the event timing and energy information, provide high voltage to the detector, maintain time synchronization, and report information over Ethernet back to a server. The voxeISPEC has connections for Ethernet, USB, SyncE clock simulation input/output, pulse per second (PPS) output, and three GPIO ports. Power may be supplied through either Power over Ethernet (PoE) or USB, depending on availability. Configuration of the device can be performed over the network or through a direct PC connection; however, PTP clock synchronization requires a network connection, otherwise the device will utilize its internal clock.

The device differs from standard nuclear instrumentation modules that require shaping delays for constant fraction discriminators, cable delays for timing offsets, and separate amplifiers for timing and energy spectroscopy. A single voxeISPEC performs these functions within a single package. A fast ADC digitizes pulses from the detector after they pass through a fast charge sensitive preamp. The digitized pulse is then analyzed by a FPGA. The FPGA is configured to identify and analyze the characteristic rise times of the type of attached detector. Points are sampled along the leading edge of the pulse for use in an interpolation function that estimates the pulse start time. Once the start time is determined, the FPGA requests the current time from the 1588 clock, which is then passed to the DSP. The DSP applies a deconvolution algorithm to determine the pulse height. Paired timing and energy information reside in a ring buffer that is monitored by the CPU at regular intervals. Data is sent from the CPU to the central server based event builder in larger packets to minimize network traffic.

Example

The block diagram illustrated generally in FIG. 2 shows the arrangement of components to operate with an internal 1588 clock mode. The invention can also be configured to operate in an external 1588 clock mode.

It will be appreciated that because all of the electronics to collect data from the radiation detector are in a single compact unit, which attaches directly to the detector on one end and a single Ethernet connection on the other end, the inventive system can be configured for nearly any geometry spread over nearly any size of area. The only constraint is that the Ethernet switches used to connect multiple detection units or nodes must be IEEE 1588 and SyncE compliant to provide for the highest timestamps accuracy in the sub-nanosecond range. Use of non-compliant switches will introduce timing delay error which will increase as the number of switches increases, potentially limiting synchronization accuracy and the size of the system. The length of Ethernet cable does not affect the synchronization capability as the cable delays are factored into and compensated by the IEEE 1588 synchronization protocol.

Example

The event builder collects the packets from each node on the network and aggregates the acquired information. Events are first separated by the originating detector, and then according to the absolute time. Events from each detector in the scattering plane are compared to each detector in the absorption plane. In cases where the time is within the coincidence window, the time and energies of each pulse are copied into a separate array for further analysis. This step reduces the amount of information to a manageable number.

Synchronous Ethernet (SyncE) operates by frequency locking the master and slave nodes together using the master clock's oscillator frequency. The master clock's internal oscillator frequency provides the Ethernet frequency signal. In standard 100 MBps Ethernet, a feedback loop constantly updates the slave PHY's internal oscillator to match the frequency in the data stream. Rather than correcting the oscillator, SyncE causes the PHY to recover the master clock's frequency and locks the slave PHY's frequency to the master. The slave then uses this frequency to sample the data stream and provide the reference frequency for the PTP clock.

If network switches capable of performing hardware assist PTP and SyncE are not available, alternatively, a GPIO of the PHY may be used to create a simulated SyncE mode through an external clock which performs the same function as SyncE [see D. Miller, "DP83640 Synchronous Ethernet Mode: Achieving Sub-nanosecond Accuracy in PTP Applications," National Semiconductor Application Note 1730, September 2007]. The PHY can select between the PHY's internal clock (standard Ethernet mode), the recovered clock (SyncE mode), or the external clock from the system. A GPIO pin on the voxelSPEC is connected to the external clock header. The clock frequency is then distributed from the master node to the slave nodes through coaxial cable. Changing between modes is written into device software through the network client interface.

The precision timing protocol operates as follows: The PTPv1 protocol is currently used for performing hardware assisted time stamping. When a PTP packet is sent or received, the PHY queries the 1588 clock and adds the time to the packet [D. Miller, "DP83640 Synchronous Ethernet Mode: Achieving Sub-nanosecond Accuracy in PTP Applications," National Semiconductor Application Note 1730, September 2007]. This removes delays from packet processing by the operating system, which can be on the order of micro-to milliseconds depending on the system [see J. Eidson, "Network Time Synchronization with IEEE 1588 (Time distribution in Embedded Systems)." 2009 EECS-149. University of California Berkeley, Berkeley. Apr. 29, 2009].

PTP phase locks the node clocks to the master clocks, but the jitter from the oscillators cause deviations on the order of tens of nanoseconds when events are transmitted across a PTP compliant switch or Ethernet hub with little network traffic. SyncE removes this jitter by frequency locking the slave nodes, causing the master to slave time jitter to be a result of the PTP algorithms and network hardware. The combined case can bring the timing down to the order of sub-nanoseconds [P. Moreira, J. Serrano, T. Wlostowski, P. Loschmidt, G. Gaderer, "White Rabbit: Sub-Nanosecond Timing Distribution over Ethernet," in ISPCS 2009, *International Symposium on Precision Clock Synchronization for Measurement, Control and Communication ISPCS* 2009, October, 2009].

As with the SyncE implementation, a software control determines whether the device acts as a master node or a slave node. Additional CPU overhead does not reduce functionality or response of a device, thus both master and slave nodes operate similarly in terms of data acquisition. For the Compton Telescope experiment, an array of devices are combined according to a common tree network structure. Switches capable of hardware assist PTP and SyncE propagate timing information from the grand master clock to each node.

Example

The experiment built to demonstrate the voxelSPEC consists of three voxelSPEC devices with one acting as a master clock without a detector, and two acting as slave nodes with LaBr$_3$(Cl) scintillator detectors, which are known for their fast timing properties. In each of the following cases, the PTP clocks were allowed to synchronize for a period of 5 minutes before collecting data to reduce the possibility of clock transients.

A 3.3 µCi (microCurie) Na-22 source was placed at the midpoint between the two detectors. Na-22 has two 511 keV gamma rays that are the result of an annihilation event between a positron and an electron. The gammas are emitted at the same instant in time and in exactly opposite directions. Thus, the source can be used to identify true coincident events from the detector based on the energy and time observed.

Evaluating the timing of the system begins with a common clock between the two devices. The shared clock was constructed from an FPGA that provides the functionality of a 1588 clock, but without any need for network transport or SyncE. This provides the best possible timing and isolates the timing variance to the pulse processing system and detectors.

Figure 4:
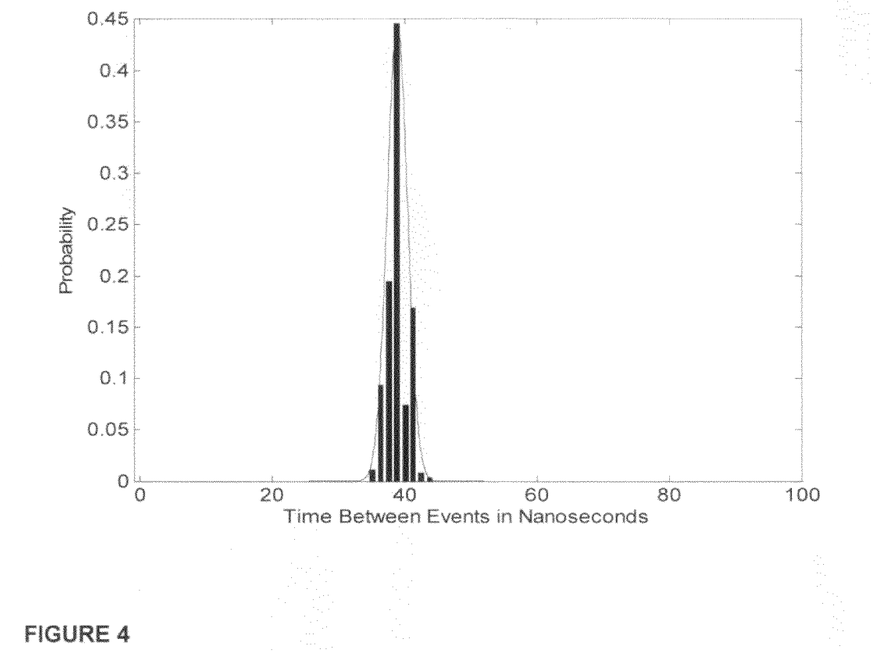
FIG. 4 shows the result of the pulse processing system electronics for a time window of 100 ns using a pulser for the input in place of a detector.

FIG. 4 shows the result of the pulse processing system electronics for a time window of 100 ns using a pulser for the input in place of a detector. The FWHM of the Gaussian is 2.14 ns.

Figure 5:
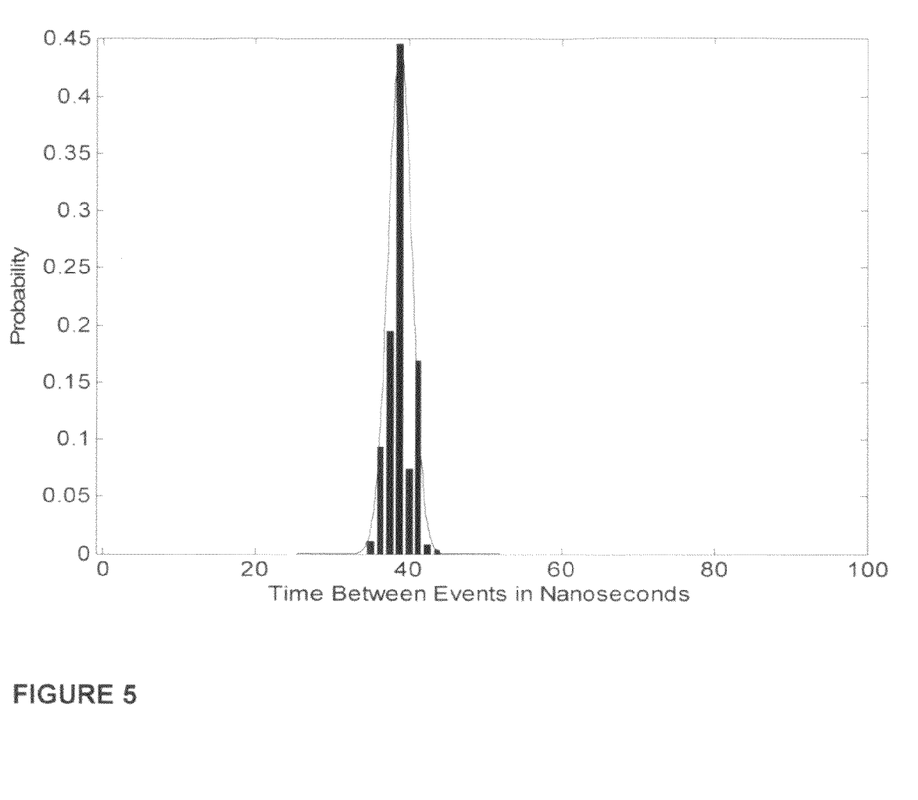
FIG. 5 shows the result of the pulse processing system electronics and the detector assemblies.

FIG. 5 shows the result of the pulse processing system electronics and the detector assemblies. An offset of about 8-9 ns is noticed in addition to the 30 ns digital delay because of the transit time difference in the number of dynodes in the photomultiplier tube. The FWHM of the Gaussian is 3.56 ns.

Figure 6:
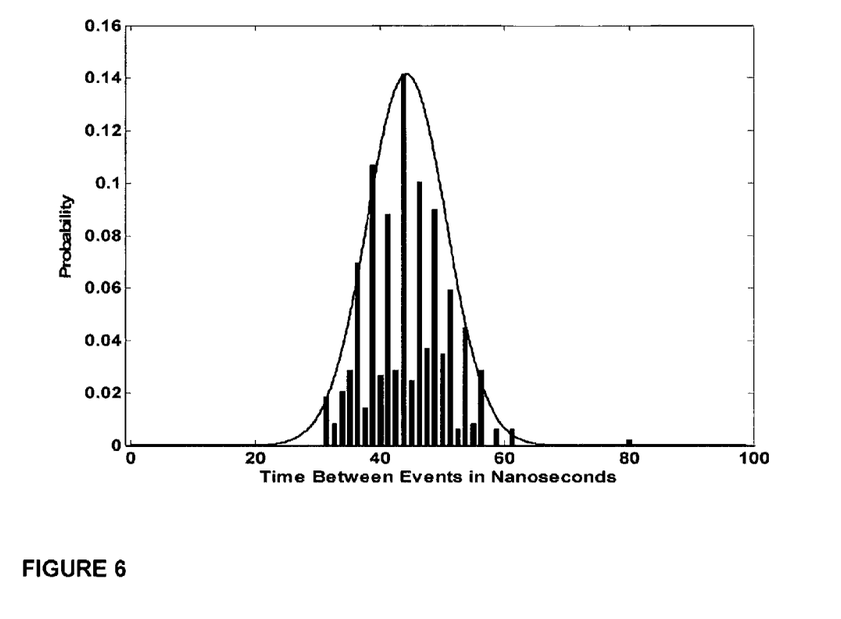
FIG. 6 provides a result with the PTP clock, without SyncE. The histogram is discretized because of the digital reconstruction of the PTP time.
Figure 7:
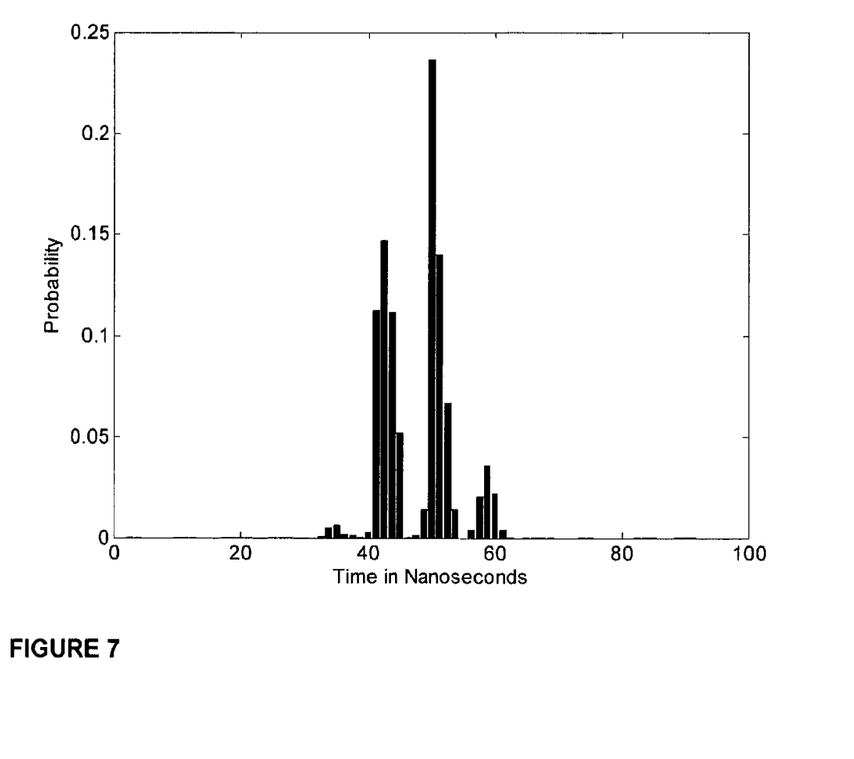
FIG. 7 illustrates the probability mass function of coincident node to node events using SynchE and PTPv1 in accordance with one aspect of the invention.

FIG. 6 provides a result with the PTP clock, without SyncE. The histogram is discretized because of the digital reconstruction of the PTP time. The FWHM using PTP is 15.24 ns. PTP transport is provided over a 100 MBps hub rather than a PTP enabled switch with hardware assist. This adds some noise from the jitter within the hub, even with low network traffic.

Whereas a conventional NIM based timing system for two detectors would consist of at least one NIM crate and power supply, two high voltage supplies, two preamplifiers, two fast timing amplifiers, two shaping amplifiers, two constant fraction delays, a time to amplitude converter (TAC), and three gated amplitude to digital converters (ADC) connected to a computer for processing, at a minimum, the inventive system, in contrast, system requires only two voxelSPEC units, an IEEE 1588 and SyncE enabled Ethernet switch, and a computer for processing. Applicants have built a version of the voxelSPEC that is only 2.25 inches in diameter and 4.5 inches long whereas the NIM based system would be at a minimum 19 inches wide by 8.75 inches tall and 21 inches deep, not including the preamplifiers and associated cables.

Additional test results and analysis are presented in the following Example.

Example

Time synchronization is critical to the performance of a large Compton telescope array. Large arrays require efficient background suppression that may be performed by discriminating incoming events according to a coincidence time window. The start event occurs at the scattering plane and the stop event occurs at the absorption plane. This window is a function of each detector's response time characteristics, signal processing parameters, and variance of the absolute time of the clock used to time stamp events.

Detectors of the front and back planes are chosen for fast response and are coupled to electronics with minimal signal processing delays that are designed to have minimal contribution to the timing variance. Each node in the array consists of an independent signal processing unit that is capable of simultaneously determining pulse height and time of each event. Events are processed using a FPGA to extract the timing information from the rise time of the detector's characteristic pulse shape. The FPGA samples the node's system clock when an event is detected and time stamps the event. After an event is acquired, the time and energy information is forwarded to a data acquisition system for building the coincidence events and further analysis. With the electronics for pulse acquisition having a nearly irreducible contribution to the timing variance, the largest contributor to the timing variance is the node's clock.

The node system clock is synchronized to a master clock through an Ethernet controller capable of combining Synchronous Ethernet (SynchE) and the IEEE 1588-2002 Precision Timing Protocol version 1 (PTPv1). SynchE uses the master clock's oscillator frequency as the 100 Mbps Ethernet reference clock, which the node passes to the internal oscillator used to drive the system clock [see D. Miller, "DP83604 Synchronous Ethernet Mode: Achieving Sub-nanosecond accuracy in PTP applications" National Semiconductor Application Note 1730. September 2007]. Each node will have nearly identical drift characteristics to the master clock and all the other nodes in the system. With the oscillator frequency locked, the variance contribution to event timing is due to the PTPv1 algorithm's ability to correct for phase shift.

PTPv1 is used to phase lock the node clock to the master's absolute time clock, as with Network Time Protocol (NTP). Multiple packets are time stamped and transported between the master clock and the nodes to correct for transmission and processing delays while synchronizing the system clock. Time stamps are managed on the Ethernet PHY directly to remove effects of random processing latencies. Industrial Ethernet switches are now beginning to release PTP compliant switches that perform time stamping on the switches to remove the queuing latencies [see Moxa Americas Inc. "EDS-600 Series Compact Modular Industrial Ethernet Switches" 2009]. Thus, delays from cable length or increased network traffic do not affect time synchronization. NTP uses software time stamping and does not correct for switch latencies; thus, large networks or heavy traffic networks adversely affect the precision of the timing. PTPv1 can synchronize on the order of nanoseconds compared to milliseconds for NTP due to these algorithms [see J. C. Eidson, "Network Time Synchronization with IEEE 1588 (Time Distribution in Embedded Systems)" 2009 EECS-149. University of California Berkeley, Berkeley. Apr. 29, 2009].

The inventive method has been experimentally tested using standard Nuclear Instrumentation Modules (NIM) to show the distribution of common events for two nodes in the system. An Ortec 567 Time-to-Amplitude Converter (TAC) reads in the start signal from one node and a stop signal from the other, and creates a pulse of magnitude comparable to the time between the events. The experimental setup uses a common pulse to trigger events on both nodes and a software implementation of the PTPv1 protocol.

Nodes were allowed to synchronize for 5 minutes before data acquisition. The resulting distribution is shown in FIG. 6 with a time window of 50 ns and the stop signal delayed by 16 ns.

The multiple peaks are results of the granularity of the time steps in the hardware modifying the phase of the nodes during operation. Peaks are spaced about 8 ns apart as this corresponds to the minimum change achievable by using the PTPv1 algorithm with hardware assisted time stamping. A complete hardware implementation of PTPv2 algorithm will reduce the multiple peak effect through improved filtering of the time differences and proper correction of switch delay time, allowing better convergence. Sharpness of the peaks is due to the minimization of the clock drift as a result of the SynchE frequency locking. The Full Width at Half Max (FWHM) is about 0.5 ns for each of the peaks, and is due to the oscillator frequency drift.

Based on the current results, a Compton telescope using a software implementation of the PTPv1 protocol could implement a coincidence window of about 40 ns. These results indicate that the timing accuracy can be significantly improved by upgrading to a hardware assisted implementation of the PTPv2 protocol.

Those skilled in the art will appreciate several surprising advantages of the inventive system:

1. Low complexity and simplicity to build large scale radiation measurement systems which provide accurate and precise time information for each event and each system element.
2. Low cost—no complex electronics for the timing measurement associated to each element. The synchronization and time measurement is provided by a network protocol and not by hardware.
3. Low power—the system does not require additional power for the timing measurements since the timing protocol is part of the communication protocol and not part of the hardware.
4. Compactness—the detection element requires only one cable to be connected through a switch to the server which could provide a very compact arrangement of the detection elements to build a complex detection system.
5. Highly scalable—the number of detection elements can be expanded without adding any additional complexity of the system

We claim:

1. A radiation detector comprising:
   at least two radiation detecting nodes, wherein first and second ones of the at least two radiation detecting nodes are arranged such that the first node is configured to detect scattering events and the second node is configured to detect absorption events related to the scattering events;
   a system server configured to communicate via Ethernet with said nodes to detect signals associated with radiation detection events; and,
   a clock system synchronizing said radiation detecting nodes according to IEEE 1588 protocol, wherein:
     one of the at least two radiation detecting nodes is configured to provide a synchronization signal including a clock frequency and a clock phase to others of the at least two radiation detecting nodes over the Ethernet,
     each radiation detecting node is configured to provide a time stamped event package to the system server in response to detecting a radiation event, and
     the time stamped event package comprises spectroscopy information and pulse shape information of the radiation event and a time stamp derived from the synchronization signal provided by the one radiation detecting node.

2. The radiation detector of claim 1 wherein each of said radiation detecting nodes is a single unit comprising:
   a radiation sensor configured to detect the radiation event;
   a high voltage power supply and a signal processor coupled to the radiation sensor;
   a local CPU configured to control the high voltage power supply and the signal processor;

a communications circuit coupled at least between the CPU and an Ethernet connection to the Ethernet; and,
a power source configured to provide power to the high voltage power supply, the signal processor, the local CPU, and/or the communications circuit.

3. The radiation detector of claim 2 wherein said radiation sensor comprises a device selected from the group consisting of: scintillator detectors, semiconductor detectors, photomultiplier tubes, proportional counters, ionization chambers, and Geiger-Mueller counters.

4. The radiation detector of claim 3 wherein said scintillator is selected from the group consisting of: NaI(Tl), BSO, LSO, CsI, LaBr$_3$, CaF$_2$, BaF$_2$, CdWO$_4$, plastics, and organic liquid detectors.

5. The radiation detector of claim 3 wherein:
the semiconductor is selected from the group consisting of: CdTe, CdZnTe, HPGe, HgI$_2$, Si, and TlBr; and
the at least two radiation detecting nodes are arranged parallel to one another.

6. The radiation detector of claim 2 wherein said signal processor comprises:
an analog to digital convertor;
a field programmable gate array; and,
a digital signal processor.

7. The radiation detector of claim 2 wherein:
the communications circuit comprises an Ethernet PHY; and
the clock system and the radiation detecting nodes are configured to provide a synchronization accuracy of less than 50 ns between the radiation detecting nodes by estimating the pulse start time from the pulse shape information and a current time provided by the clock system.

8. The radiation detector of claim 2 wherein said power source is selected from the following group: a Power over Ethernet (PoE) connection; and a USB connection.

9. The radiation detector of claim 1 wherein the architecture of said Ethernet includes said system server and at least the following components:
an event builder;
a grand master 1588 clock; and,
at least one IEEE 1588-compliant switch.

10. The radiation detector of claim 1 wherein:
the clock system synchronizes said radiation detecting nodes according to IEEE 1588 protocol in conjunction with Synchronous Ethernet protocol;
IEEE 1588 is used to synchronize the clock phase and Synchronous Ethernet is used to synchronize the clock frequency; and
the clock system and the radiation detecting nodes are configured to provide a synchronization accuracy of less than 1 ns between the radiation detecting nodes by estimating the pulse start time from the pulse shape information and a current time provided by the clock system.

11. The radiation detector of claim 1 wherein the time stamped event package comprises a time distance to a previous radiation detection event.

12. A method for detecting radiation comprising the following steps:
a) providing a plurality of radiation detecting nodes, each of which converts a radiation capture event into an electrical signal, wherein first and second ones of the at least two radiation detecting nodes are arranged such that the first node is configured to detect scattering events and the second node is configured to detect absorption events related to the scattering events;
b) providing a system server in Ethernet communication with each of said radiation detecting nodes, to analyze said electrical signals and obtain information indicating a selected characteristic of the radiation captured; and,
c) synchronizing each of said plurality of radiation detecting nodes on said Ethernet, using a clock system operating according to IEEE 1588 protocol, wherein:
one of the plurality of radiation detecting nodes is configured to provide a synchronization signal including a clock frequency and a clock phase to others of the plurality of radiation detecting nodes over the Ethernet,
each radiation detecting node is configured to provide a time stamped event package to the system server in response to detecting a radiation event, and
the time stamped event package comprises spectroscopy information and pulse shape information of the radiation event and a time stamp derived from the synchronization signal provided by the one radiation detecting node.

13. The method of claim 12 wherein each of said radiation detecting nodes is a single unit comprising:
a radiation sensor configured to detect the radiation event;
a signal processor coupled to the radiation sensor;
a local CPU configured to control the signal processor;
a communications circuit coupled at least between the CPU and an Ethernet connection to the Ethernet; and,
a power source configured to provide power to the signal processor, the local CPU, and/or the communications circuit.

14. The method of claim 13 wherein said radiation sensor comprises a device selected from the group consisting of: scintillator detectors, semiconductor detectors, photomultiplier tubes, proportional counters, ionization chambers, and Geiger-Mueller counters.

15. The method of claim 14 wherein said scintillator is selected from the group consisting of: NaI(Tl), BSO, LSO, CsI, LaBr$_3$, CaF$_2$, BaF$_2$, CdWO$_4$, plastics, and organic liquid detectors.

16. The method of claim 14 wherein:
the semiconductor is selected from the group consisting of: CdTe, CdZnTe, HPGe, HgI$_2$, Si, and TlBr; and
the plurality of radiation detecting nodes are arranged parallel to one another.

17. The method of claim 13 wherein said signal processor comprises:
an analog to digital convertor;
a field programmable gate array; and,
a digital signal processor.

18. The method claim 13 wherein:
the communications circuit comprises an Ethernet PHY; and
the clock system is configured to provide a synchronization accuracy of less than 50 ns between the radiation detecting nodes.

19. The method of claim 12 wherein the architecture of said Ethernet includes said system server and at least the following components:
an event builder;
a grand master 1588 clock; and,
at least one IEEE 1588-compliant switch.

20. The method of claim 12 wherein:
the clock system synchronizes said radiation detecting nodes according to IEEE 1588 protocol in conjunction with Synchronous Ethernet protocol;

IEEE 1588 is used to synchronize the clock phase and Synchronous Ethernet is used to synchronize the clock frequency; and the clock system is configured to provide a synchronization accuracy of less than 1 ns between the radiation detecting nodes.

21. The method of claim 12 wherein the time stamped event package comprises a time distance to a previous radiation detection event.

\* \* \* \* \*